United States Patent Office 3,355,526
Patented Nov. 28, 1967

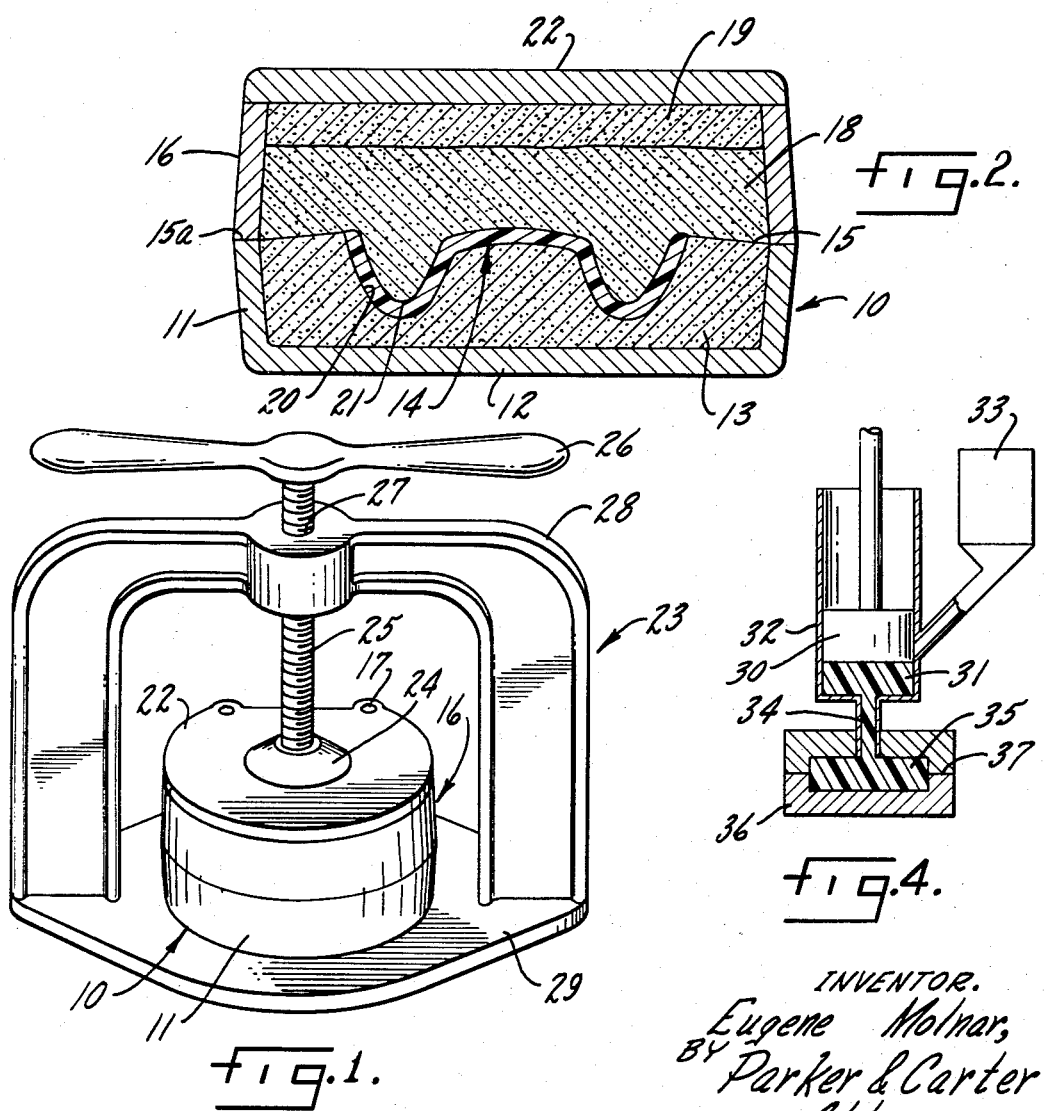

3,355,526
METHOD OF MOLDING URETHANES
Eugene Molnar, La Grange, Ill., assignor to Coe Laboratories Inc., Chicago, Ill., a corporation of Illinois
Filed Aug. 10, 1965, Ser. No. 478,624
1 Claim. (Cl. 264—16)

This invention relates to a method for molding elastomeric urethane resin products substantially free of voids and porosities; it further relates to a urethane resin composition which may be molded with reduced voids and porosities, and improved physical properties and is a continuation in part of my co-pending application Ser. No. 290,206 filed June 24, 1963, now abandoned.

Urethane resin products are highly desirable because such resins have excellent abrasion and tear resistant properties as well as resistance to deteriorating factors such as ozone, oil and oxygen. In many applications, it is required that the resin product be substantially free of voids or porosities. Examples of such products are wheels, gaskets, diaphragms, coating rollers and potted connections and encapsulated electrical connections. A bubble-free resin also has a better appearance and normally would be expected to have more value.

Before casting such resin, it has been the practice to degas the urethane resin with vacuum pumps and reaction chambers, and to provide elevated temperature cures with large ovens. Thus, a melted resin has been first degassed, a curing system added, and then again degassed before the resin was transferred to a mold. Such a mold was then placed in an oven and cured one or more hours at temperatures around 210° F. The resulting products usually shrink away from the mold and therefore are not accurately dimensioned.

A resin composition which retains desirable attributes of polyurethane plus other advantages such as resistance to elevated temperature or good properties after heat aging is also desired.

A primary object of this invention is a method by which elastomeric urethane resin products may be made more simply at a lower cost, in a faster operation, and without complicated control procedures.

Another object is a method for molding elastomeric urethane resins without requiring degassing steps to prevent voids and porosities.

Another object is a method for making elastomeric urethane resin products substantially free of voids at room temperature to thereby eliminate the necessity of an elevated heat cure and the use of hot molds.

Another object is a method for molding elastomeric urethane resin products substantially free of voids without the necessity of using ancillary equipment such as vacuum pumps and degassing chambers to degas the resin.

Another object is an elastomeric molded urethane resin product which is substantially free of porosities and voids so that the desirable physical properties of urethane resin may be enjoyed without detractions associated with such voids and porosities.

Another object is an elastomeric urethane resin product having reduced porosities which may be used in many applications including the dental field as a teeth protector for contact sports, a soft lining for artificial dentures, ear molds and prosthetic human applications.

Another object is a method which leads to greater versatility in molding elastomeric urethane resins substantially free of voids so that intricate objects with involved geometry may be efficiently produced.

Another object is a method which provides a final product free of voids or porosities, and which is dimensionally accurate relative to the mold in which the resin has been molded.

Another object is a method whereby delayed heat cure may be used to accelerate curing of a urethane resin partly hardened at room temperature so that the disadvantages associated with heat cures alone are not encountered, such as dimensional change.

Another object is a method for making elastomeric urethan resin products by a simple procedure wherein inexpensive closed molds such as molding flasks may be quickly and efficiently formed to mold such resin products between upper and lower mold impressions substantially free of voids at room temperature.

Another object is a method for making solid elastomeric urethane resins without requiring initial heat cures and thereby eliminating thermal shrinkage of the product which would occur upon cooling.

Another object is a method which permits economical custom molding of urethane resins substantially free of voids.

Such objects are attained along with other objects which will become apparent from the following disclosure, which includes drawings wherein:

FIGURE 1 is a perspective of a molding flask, and
FIGURE 2 is a sectional view of the molding flask of FIGURE 1.

The available urethane resins, including the prepolymers, are conventionally combined with a known catalyst to convert them to an elastomer. The urethane resins are the reaction products of a polyisocyanate combined with a polyol such as polyglycol, a polyether or a polyester. Various U.S. patents disclose such resins and the methods of their preparation. Among others may be mentioned 2,620,516, 3,012,992, 3,024,207 and 3,061,574. Polyurethane resins or prepolymers and curing agents may be obtained from a wide number of suppliers such as the Witco Chemical Company (Formerez), The Thiokol Company (Solithane), the Du Pont Company (Adiprene), Goodyear (Chemigum) and others.

It is known that conventional urethane resins have on occasion been cured at room temperature by combining the resins with an appropriate catalyst. An accelerator has also been added to increase the cure rates. The catalysts for the prepolymer urethanes are most commonly selected from the available amines, glycols and others which are well known in the art. Such catalysts may be used in various amounts depending on the type selected, the type of cured resins desired and the rate of curing desired. Some of the amines which may be mentioned are methyl-bis-chloroaniline, triethylene diamine alone or in solution with hexanetriol, certain trialkyl amines such as n-alkyl morpholine, dichlorobenzidene and others of the type disclosed in U.S. 2,939,851. In many applications the amine may be present from about 2% to about 25% by weight and in any other amounts conventionally used.

The accelerator is not a necessary ingredient but may be used in amounts substantially similar to the curing agent.

The actual curing time will vary depending, in part, on the type and amount of catalyst present, but a time period of about 12 hours is usually sufficient. Many types of urethane resins may be combined with a curing system which may include a variety of catalysts and accelerators in various proportions. Among the known accelerators for polyurethanes are many tin organic compounds such as dibutyl tin dilaurate, tin octoate and others such as those listed in British Patent 888,316.

It is now provided according to the present invention that a positive pressure is applied to the liquid mixture before it cures or hardens, i.e. during its plastic pot life. It has been found that generally only moderate pressure levels are required to obtain a molded resin product substantially free of voids or porosities. The invention may be schematically outlined as in the following flow diagram:

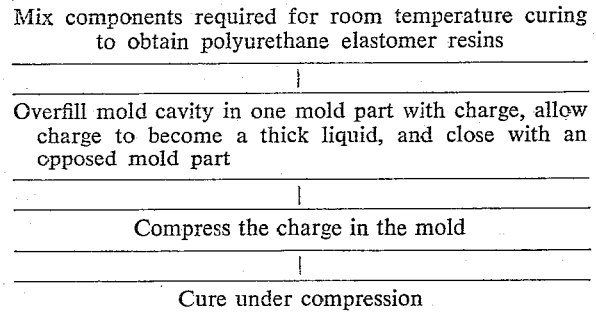

The minimum pressure level is in the order of at least 30 p.s.i. Generally this minimum level of pressure assures successful molding but lower and higher departures from this level may be made when dealing with different products. Thus, for example, a very thin layer of molded urethane having a large area may be molded free of voids at pressures as low as 10 p.s.i. The normal level of at least about 30 p.s.i. would, however, assure non-porous molding of most small urethane resin products. Accordingly, much higher pressures may be required for certain larger products. The actual amount of positive pressure over atmospheric will readily be determined by the skilled man for a particular operation. Likewise, the consistency or viscosity of larger volumes should be observed because it becomes more difficult to remove the bubbles in such larger volumes when the liquid becomes too heavy or thick. Conversely, smaller volumes or thinner dimensions lead to less difficulty in removing the bubbles even at more viscous levels.

The particular time when the positive pressure is applied is not critical so long as it is applied during the very plastic stage of the pot life. By the term "pot life" is meant the time measured from blending the resin with the catalyst until the blend is no longer pourable.

The plastic stage, of course, refers to the condition where the shape or form of the volume undergoes changes but provides some resistance to applied forces or pressures. There is no practicable end point to define the viscosity of the plastic stage because this resin is continually undergoing a cure, but a convenient and workable index is a consistency which resembles that of conventional honey. At such a viscosity, the "thickened liquid" attains a consistency providing some resistance to applied pressure. In molding a particular item, the skilled man will readily determine the consistency range which will efficiently operate to provide a desirable practice of the method.

As stated, larger volume items should have a lower viscosity relative to smaller volume items when the pressure is applied. The way in which compression is effected will also be a consideration. When the molded article is desirably formed in a mold cavity, between opposed mold impressions, the consistency of the resin is like honey when compression is effected. In an open mold, fluid pressure is applied within a closed environment against a confined resin deposit, and such resin may be a light or thin liquid since it is not necessary to provide resistance to the applied pressure. In a mechanical compression or injection type of molding the resin may again be a light liquid since it is maintained under compression in a confining mold cavity. In any event, once the compression is started it would preferably be maintained until the molded product is cured to a desired degree.

The closed mold shown in FIGURES 1 and 2 may be used to mold articles between opposed mold impressions forming a mold cavity. Such molds are of the founding type and include the molding flasks which are used to make dental plates. Reference shall be made to such a flask for purposes of illustration but such "closed molds" may be adapted to casting a wide variety of products in different shapes and sizes. There is generally shown a lower flask or drag 10 which may be considered as a container with a continuous side wall 11 joined to a floor 12. The bottom flask is filled with a freshly prepared plaster material 13 which may be a hard plaster such as Hydrocal supplied by U.S. Gypsum. One side of the article to be reproduced, which is shown as a wax impression of an upper palate 14, is positioned on the plaster and the area 15 alongside the article is smoothed with a blade. A separating medium such as a lubricating paste is applied to the area 15, and an upper flask or cope 16 is mounted. The separation between the upper and flasks is indicated at 15a. Bolts or pins such as 17 may be used to position the upper flask in the lower one. Plaster 18 is laid down through the open top to cover the article followed by a second portion 19 to entirely fill the upper flask. The plaster may be added in one portion, if desired. A cover 22 may then be mounted to close the open top and to level the plaster in the upper flask. After the plaster is hardened, the wax article may be removed by contacting the flask with hot water to loosen the wax article so it can be easily removed.

The closed mold cavity formed by the upper and lower mold impressions is now ready for casting urethane under pressure. This is done by overfilling the lower mold impression 20 with a charge of urethane resin and catalyst mixture. The mixture may be stirred gently to facilitate collection of the air bubbles near the surface, and when the viscosity has increased to about the consistency of honey, then the upper flask 16 with the upper mold impression 21 is mounted. The cover 22 is positioned in place by the bolts or pins, and the flask assembly is placed in a press shown generally as 23. The foot 24 is pressed against the cover 22 by the screw 25 which may be turned by handle 26. The screw 25 is turned in threaded passageway 27 in the top of supporting arch 28 which is rigidly joined at its opposed ends to base 29. The press is turned down onto the cover of the flask until the upper and lower flasks are placed in tight, abutting relationship. The overfill of urethane resin will be squeezed out between the matching areas 15 of the mold. The flask is maintained under such pressure until the cast urethane resin product is desirably cured.

The foregoing description illustrates how quickly and efficiently a closed mold cavity can be formed for casting urethane resin products between opposed mold impressions substantially free of voids. Such mold forming materials are preferably of the type which harden at room temperature. If desired, materials other than plaster may be used to form the mold impression. These may include various resins such as room temperature curing silicone rubbers, polysulfide elastomers, polyesters, epoxies and the like. All such materials can be processed and manipulated according to well known steps. The cavity impressions also can be metal plated by electrolysis or the like to provide a tough cavity mold which can be used repeatedly for numerous castings. If will be appreciated that molds, as described herein, can be quickly and efficiently formed not only to process urethane moldings free of voids, but other types of such castings which can be economically made to fill custom or small orders. It is not required to make expensive, machined or involved dies.

The pressure may be applied to other types of molds, for example, where a resin blend is placed in a lower part and an upper part is telescoped therein until stops such as offset portions make contact. The upper part is then urged by the pressure against a resin mixture having a volume slightly greater than the volume of the finally desired product. This is a highly advantageous procedure because it is simply performed and permits the use of inexpensive and versatile molds such as those molds made of wood or plaster. Such molds have been previously contraindicated for cast urethane resins because they hold moisture which will cause foaming and entrapment of bubbles when using a heat cure. In the closed mold process, the resin mixture is allowed to become viscous or a thickened liquid but not to harden. It is allowed to form a plastic mass having a consistency so that its overcapacity volume in one part of the mold provides some resistance to the applied pressure or compression from the other part of the mold which closes and makes contact with the first part of the mold. Some gentle agitation of the liquid resin is desirable while its viscosity is increasing to facilitate the rise of the bubbles towards the surface. This allows the compression step to more efficiently lead to a product substantially devoid of voids and porosities. The agitation should be gentle lest small bubbles form undesirably larger ones with other small bubbles. Such agitation may be provided by gentle mixing, gentle tapping or shaking of the molding flask, or the like.

While the necessity and disadvantages of a heat cure have been removed from the process, a delayed heat cure or oven aging may be used to advantage. The urethane resin composition is initially partly cured at room temperature under positive pressure as set forth above. The partly cured molded resin may then be placed in an oven and heated for several hours. The delay before the heat cure is applied can be varied so long as it occurs after the resin product has attained sufficient structural strength to be removed from the mold. The product, however, does not have to be removed from the mold during oven aging. The hardness of the resin product is normally increased by aging, but it may be accelerated by applying the delayed heat cure. This step improves the final product dimensionally as compared with products by the heat cure alone.

The following examples are presented to illustrate the practice of the invention but they should not be viewed as exclusive embodiments.

*Example I*

One hundred grams of a urethane prepolymer resin supplied by the Thiokol Company under the tradename of Solithane 291 is heated to about 190° F. This liquefied urethane is identified as preparation A.

Another mixture is prepared by liquefying about nine grams of a tertiary amine curing agent supplied by the Du Pont Company under the tradename Moca. This tertiary amine is identified as methyl-bis-chloraniline. This curing agent is solid at room temperatures. It is liquefied and to the tertiary amine is added from 3 to 5 drops of dibutyl tin dilaurate. This mixture is identified as preparation B.

After A and B are mixed thoroughly at temperatures of about 200° F., one portion of this mixture is poured into the bottom part of a two part mold of the type shown in FIGURES 1 and 2. This part of the mold is overfilled with the resin mixture. The use of the term "overfill" means that the volume of the resin mixture is slightly greater than the finally desired volume. It is permitted to stand for about five minutes until the resin mixture becomes a heavy gel. The second part of the mold is placed within the first part and over the mixture. A "hand press" such as the one shown in FIGURE 1 is used to apply pressure to the gel until male and female parts in both molds contact. The closed mold is allowed to stand overnight after which it is opened and the solid elastomeric resin products are removed substantially free of voids and possessing good mechanical properties.

*Example II*

To 90 grams of liquefied Solithane 291 prepolymer urethane resin is added 10 grams of RTV 11 hydroxy silicone supplied by the General Electric Company. To 9 grams of liquefied methylene-bis-chloroaniline is added 4 drops of dibutyl tindilaurate.

The prepolymer system is blended with the curing system and the combined mixture and allowed to stand for about 10 minutes until the mixture attains a consistency resembling honey.

The foregoing invention can now be practised by those skilled in the art, and such practitioners will know that the invention is not necessarily restricted to the particular embodiments presented herein. The scope of the invention is to be defined by the terms of the following claim as given meaning by the preceding description.

I claim:

A method of casting elastomeric urethane resin products for dental applications, which products are substantially free of voids, said method including the steps of:
  mixing a urethane resin with a substantially room temperature curing system to obtain a urethane casting mixture,
  confining a charge of the urethane casting mixture in a first mold part of a mating two part mold,
  overfilling said first mold part with said urethane casting mixture,
  partially curing the deposited urethane casting mixture in said first mold part until the urethane casting mixture assumes a honey-like consistency,
  placing the other mating mold part upon the first mold part,
  forcing the mold parts together with a force sufficient to overcome the resistance of the partially cured urethane casting mixture, and
  maintaining the force upon the mated mold parts until the urethane casting mixture is substantially cured.

References Cited

UNITED STATES PATENTS

| 912,092 | 2/1909 | Droitcour | 264—88 |
| 2,442,847 | 6/1948 | Galley | 264—17 |
| 2,729,618 | 1/1956 | Muller et al. | 264—331 |
| 2,755,552 | 7/1956 | Brandau | 128—89.1 |
| 2,790,998 | 5/1957 | Dimmer | 264—17 |
| 2,884,388 | 4/1959 | Hedlund | 260—824 |
| 2,939,851 | 6/1960 | Orchin | 260—22 |

FOREIGN PATENTS

| 269,037 | 4/1927 | Great Britain. |

OTHER REFERENCES

Acrylics, Tylman et al., 1946, p. 85, 86, and 87.

DONALD J. ARNOLD, *Primary Examiner.*

B. SNYDER, A. H. KOECKERT, *Assistant Examiners.*